United States Patent
Karhunen et al.

(10) Patent No.: US 7,605,744 B1
(45) Date of Patent: Oct. 20, 2009

(54) METHOD FOR EXTENSION OF UNAMBIGUOUS RANGE AND VELOCITY OF A WEATHER RADAR

(75) Inventors: Pentti Karhunen, Vantaa (FI); Sebastian Torres, Norman, OK (US); Alan Siggia, Westford, MA (US); Richard Passarelli, Westford, MA (US)

(73) Assignee: Vaisala OYJ, Helsinki (FI)

( * ) Notice: Subject to any disclaimer, the term of this patent is extended or adjusted under 35 U.S.C. 154(b) by 0 days.

(21) Appl. No.: 12/132,366

(22) Filed: Jun. 3, 2008

(51) Int. Cl.
*G01S 13/00* (2006.01)
*G01S 13/58* (2006.01)
*G01S 13/08* (2006.01)

(52) U.S. Cl. .................. 342/26 R; 342/26 A; 342/26 B; 342/26 C; 342/26 D; 342/112; 342/159; 342/127; 342/128; 342/129; 342/137

(58) Field of Classification Search ............... 342/26 R, 342/26 A, 26 B, 26 C, 26 D, 104, 107, 109, 342/112, 118, 127–129, 137, 159
See application file for complete search history.

(56) References Cited

U.S. PATENT DOCUMENTS

| | | | | |
|---|---|---|---|---|
| 3,883,871 A * | 5/1975 | Moore | ................. | 342/201 |
| 4,040,057 A * | 8/1977 | Cross et al. | ................. | 342/159 |
| 4,537,502 A * | 8/1985 | Miller et al. | ................. | 356/5.11 |
| 4,730,189 A * | 3/1988 | Siegel et al. | ................. | 342/104 |
| 5,028,929 A * | 7/1991 | Sand et al. | ................. | 342/26 B |
| 5,115,244 A * | 5/1992 | Freedman et al. | ........... | 342/158 |
| 5,150,125 A * | 9/1992 | Hager | ................. | 342/120 |
| 5,442,359 A * | 8/1995 | Rubin | ................. | 342/109 |
| 6,081,221 A * | 6/2000 | Zrnic et al. | ................. | 342/26 R |
| 6,097,329 A * | 8/2000 | Wakayama | ............... | 342/26 D |
| 6,639,546 B1 * | 10/2003 | Ott et al. | ................. | 342/129 |
| 6,844,842 B2 * | 1/2005 | Kroeger et al. | ................. | 342/70 |
| 6,989,782 B2 * | 1/2006 | Walker et al. | ................. | 342/134 |
| 7,046,190 B2 * | 5/2006 | Steudel | ................. | 342/127 |
| 7,064,704 B2 * | 6/2006 | Bergkvist | ................. | 342/160 |
| 7,158,077 B2 * | 1/2007 | Brosche | ................. | 342/137 |

* cited by examiner

*Primary Examiner*—Thomas H Tarcza
*Assistant Examiner*—Peter M Bythrow
(74) *Attorney, Agent, or Firm*—Muncy, Geissler, Olds & Lowe, PLLC

(57) ABSTRACT

A method for extension of unambiguous range and velocity of a weather radar. To avoid pulse overlaying, the pulse repetition time of a single pulse can be extended such that any return echo will arrive at the radar before the next pulse is transmitted. When pulse repetition time is increased, the maximum unambiguous range increases while the maximum unambiguous velocity decreases. The pulse overlaying can be avoided if consecutive pulses are sent on different frequencies that are far enough from each other to allow separation of pulses arriving simultaneously at the radar. When different frequencies are used an unknown phase difference is generated by distributed atmospheric targets to the return signals. This normally prevents use of the shorter pulse repetition time for velocity calculation.

4 Claims, 4 Drawing Sheets

METHOD FOR EXTENSION OF UNAMBIGUOUS RANGE AND VELOCITY OF A WEATHER RADAR

The invention relates to a method for extension of unambiguous range and velocity of a weather radar.

Weather radars are used for determining wind speeds in various heights of atmosphere. The measurement takes typically place by sending electromagnetic radiation in a pulsed manner to atmosphere, detecting radiation backscattered from the atmospheric targets, and measuring Doppler shift of the scattered signal.

Typically a weather radar is a pulse radar with a transmitter and a receiver. The transmitter transmits a finite-length radio wave pulse at a carrier frequency and the pulse is repeated at repetition time (PRT) intervals. The sent pulses are scattered from meteorlogical targets like water droplets or ice crystals.

The receiver is typically used to measure the reflected signal's power or Doppler shift or both. Samples are taken from the received signal so that the power can be calculated by squaring the samples taken.

Doppler shift estimates are based on change of phase of the signal from pulse to pulse or on the signal's autocorrelation function values.

Typical pulse radar applications include weather radars in which power measurements are used to determine rainfall and delay measurements are used to determine wind speeds.

In a weather radar pulse overlaying occurs when the echo from a pulse sent from the radar at an earlier time is received concurrently with the echo of a pulse sent at a later time. To avoid this condition, the pulse repetition time (PRT) of a single pulse can be extended such that any return echo will arrive at the radar before the next pulse is transmitted. The maximum unambiguous range is then R=cT/2, where T is the pulse repetition time and c is speed of light.

The maximum obtainable unambiguous velocity using pulse repetition time T is v=+/−λ/4T, where λ is wavelength of the radar carrier frequency When T is increased, the maximum unambiguous range increases while the maximum unambiguous velocity decreases. This is called range/velocity ambiguity.

The pulse overlaying can be avoided if consecutive pulses are sent on different frequencies that are far enough from each other to allow separation of pulses arriving simultaneously at the radar.

When different frequencies are used an unknown phase difference is generated by distributed atmospheric targets to the return signals. This normally prevents use of the shorter pulse repetition time for velocity calculation.

It is an object of the presented invention to overcome the effect of the unknown phase difference and to provide an entirely novel type of method for extension of unambiguous range and velocity of a weather radar.

The pulse repetition time of pulses on different frequencies can be made short enough to allow for solving of velocity ambiguity.

Further, the pulse repetition times for pairs of pulses with different frequency can be extended to achieve unambiguous range.

Further, in the method in accordance with the invention is sent at least two different carrier frequencies ($f_1$, $f_2$) with different pulse repetition times (PRT, (T+δ), (T−δ)), such that at least the pulse repetition time (PRT, (T+δ), (T−δ)) of one of the frequencies ($f_2$) is continuously altered and the phase differences (Δp) between the sent and received signals is defined at least at two different transmit frequencies ($f_1$, $f_2$), and subtracting the defined phase differences (Δp) from each other in order to solve range and velocity ambiguity of the measurement.

The invention offers significant benefits over conventional techniques.

The invention improves unambiguous range and velocity measurement of a weather radar. Further it shows that use of short pulse intervals is not necessary allowing more recovery time for transmitter between pulses.

In the following the invention is described in greater detail with help of exemplifying four embodiments illustrated in the appended drawings in which FIG. 1 shows a first embodiment in accordance it the invention with transmission sequence of two alternating pulse repetition times (PRT).

Figure 1:
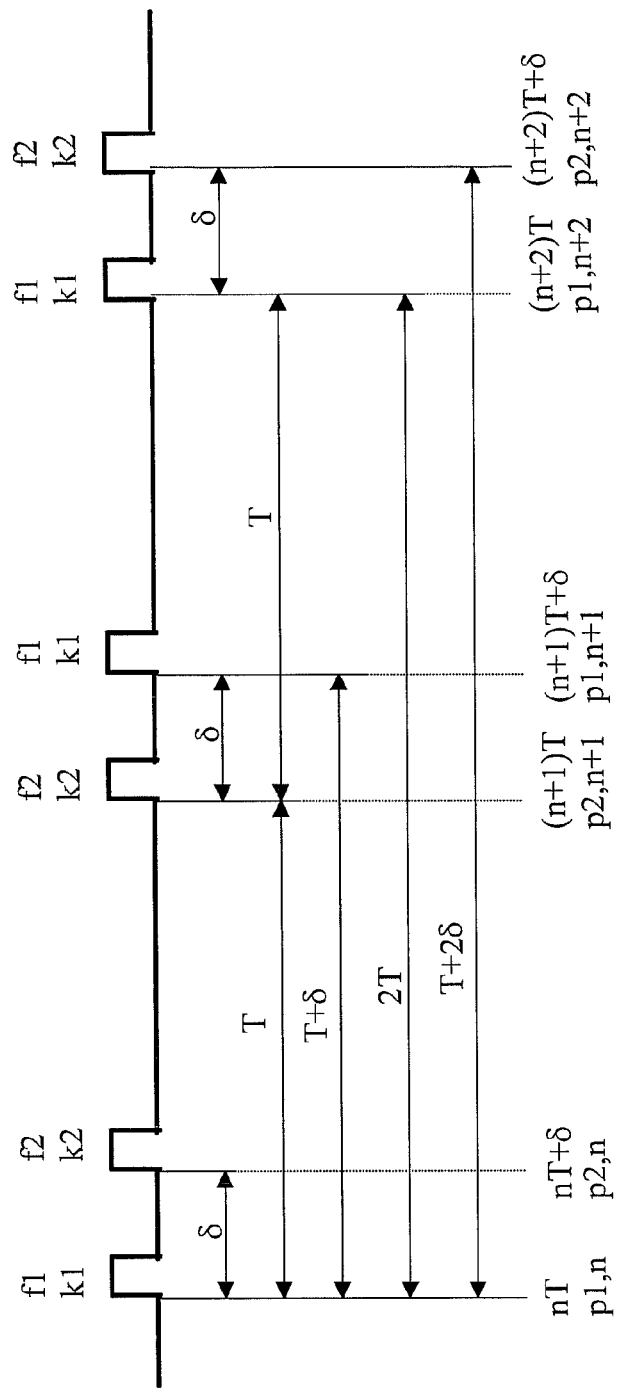

In accordance with FIG. 1 pulses are transmitted at carrier frequencies $f_1$ and $f_2$. If v is velocity of an object the distance that the object travels during time t is vt. This can be written in terms of phase change of due to radar carrier frequencies $f_1$ and $f_2$ as $p_1$=vt$k_1$ and $p_2$=vt$k_2$, where $k_1$=4π$f_1$/c and $k_2$=4π$f_2$/c.

When unknown initial phases $\phi_1$ and $\phi_2$ are taken into account, the measured phase differences for even n can be written in form:

$$p_{1,n}=vnTk_1+\phi_1 \quad (1)$$

$$p_{2,n}=v(nT+\delta)k_2+\phi_2 \quad (2)$$

$$p_{2,n+1}=v(n+1)Tk_2+\phi_2 \quad (3)$$

$$p_{1,n+1}=v[(n+1)T+\delta]k_1+\phi_1 \quad (4)$$

Where $\phi_1$ and $\phi_2$ are unknown initial phases.

In order to solve for v from short interval pulses (1) is subtracted from (2) and (3) from (4):

$$(p_{2,n}-p_{1,n})=v[nTk_2+\delta k_2-nTk_1]+(\phi_2-\phi_1)$$

$$(p_{1,n+1}-p_{2,n+1})=v[(n+1)Tk_1+\delta k_1-(n+1)Tk_2]+(\phi_1-\phi_2)$$

To eliminate unknown phases these equations are summed:

$$v=[(p_{2,n}-p_{1,n})+(p_{1,n+1}-p_{2,n+1})]/[(T+\delta)k_1-(T-\delta)k_2]$$

Summing order in the numerator can be changed for:

$$v=[(p_{1,n+1}-p_{1,n})-(p_{2,n+1}-p_{2,n})]/[(T+\delta)k_1-(T-\delta)k_2] \quad (5)$$

For odd n can be written:

$$p_{2,n+1}=v(n+1)Tk_2+\phi_2 \quad (6)$$

$$p_{1,n+1}=v[(n+1)T+\delta]k_1+\phi_1 \quad (7)$$

$$p_{1,n+2}=v(n+2)Tk_1+\phi_1 \quad (8)$$

$$p_{2,n+2}=v[(n+2)T+\delta]k_2+\phi_2 \quad (9)$$

Again in order to define v from short interval pulses (6) is subtracted from (7) and (8) from (9):

$$(p_{1,n+1}-p_{2,n+1})=v[(n+1)Tk_1+\delta k_1-(n+1)Tk_2]+(\phi_1-\phi_2)$$

$$(p_{2,n+2} - p_{1,n+2}) = v[(n+2)Tk_2 + \delta k_2 - (n+2)Tk_1] + (\phi_2 - \phi_1)$$

To solve for v and to eliminate unknown phases these equations are summed to get:

$$v = [(p_{1,n+1} - p_{2,n+1}) + (p_{2,n+2} - p_{1,n+2})] / [(T+\delta)k_2 - (T-\delta)k_1]$$

Summing order in the numerator can again be changed for:

$$v = [(p_{2,n+2} - p_{2,n+1}) - (p_{1,n+2} - p_{1,n+1})] / [(T+\delta)k_2 - (T-\delta)k_1] \quad (10)$$

Thus from (5) and (10) v is available for odd and even n and they can summed for all n to get final estimate for v.

If approximation $f_1 \sim f_2$ is made and thus $k_1 \sim k_2 = k$ (5) and (10) can be written $$v = [(p_{1,n+1} - p_{1,n}) - (p_{2,n+1} - p_{2,n})] / [(T+\delta) - (T-\delta)]k, \text{ for even n} \quad (11)$$

$$v = [(p_{2,n+2} - p_{2,n+1}) - (p_{1,n+2} - p_{1,n+1})] / [(T+\delta) - (T-\delta)]k, \text{ for odd n} \quad (12)$$

The form of (11) and (12) shows that Doppler velocity can be expressed in terms of differences of short and long pulse periods which is equivalent to pulse staggering. It is, however unnecessary to make the approximation $f_1 \sim f_2$, because exact result for v is available from (5) and (10).

The advantage to usual pulse staggering using only one frequency is that using two carrier frequencies short and long pulse periods are used at the same time. Thus double amount of observations is obtained and variance of the unambiguous velocity estimate is reduced.

Figure 2:
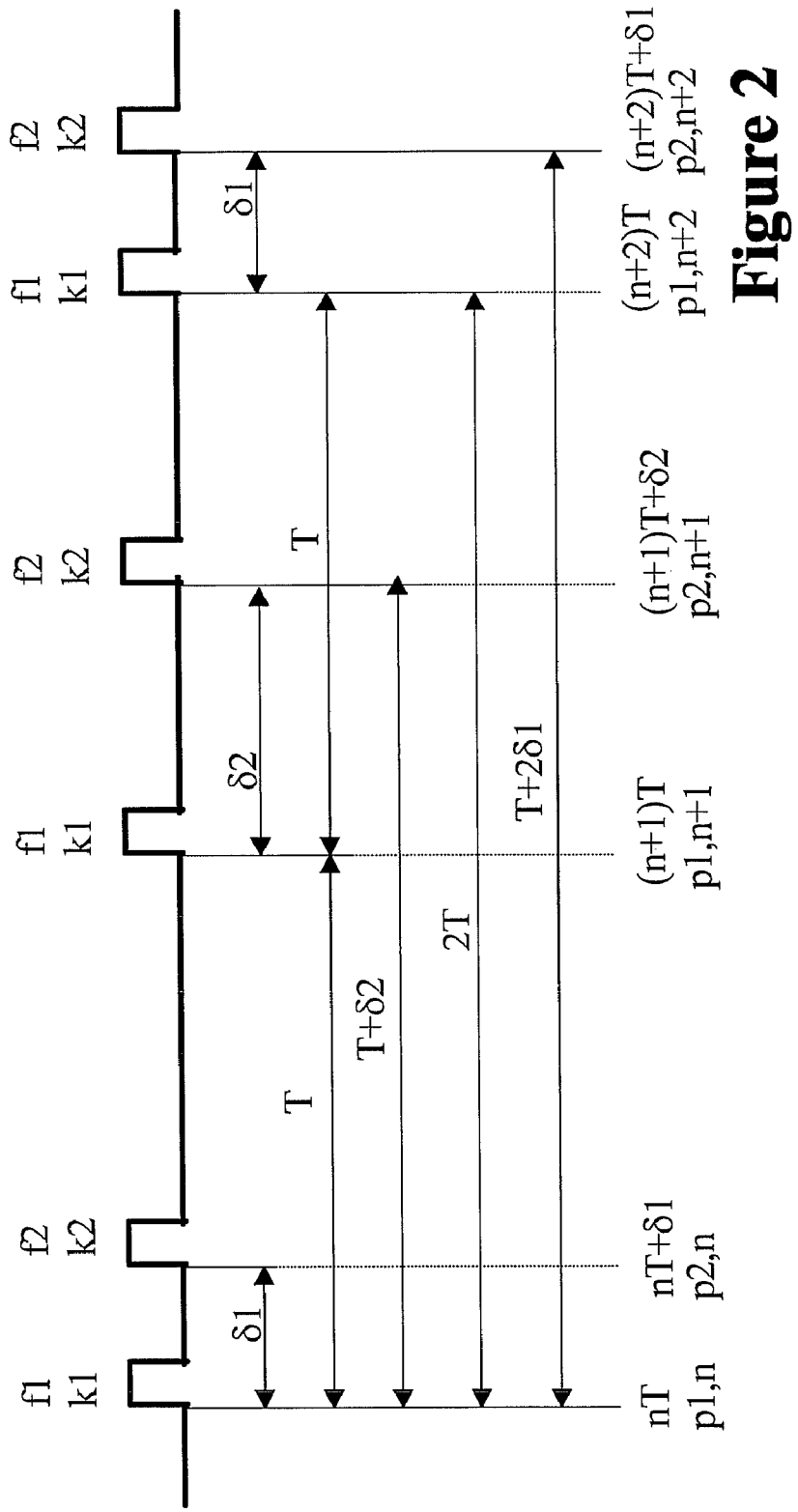
FIG. 2 shows a second embodiment in accordance it the invention with one constant PRT Sequence and One Alternating PRT Sequence.

FIG. 2 shows a second embodiment with one constant PRT Sequence and One Alternating PRT Sequence In previous method v is obtained from phase differences of each carrier frequency using short and long pulse periods and then taking difference of these. To obtain unambiguous estimate of v it is not necessary to transmit short interval pulse pairs. Instead $f_1$ can be transmitted at constant pulse period and then $\delta$ can be alternated between two values $\delta_1$ and $\delta_2$ to obtain a staggered sequence as indicated in picture 2.

For even n it can written for four consecutive pulses:

$$p_{1,n} = vnTk_1 + \phi_1 \quad (13)$$

$$p_{2,n} = v(nT + \delta_1)k_2 + \phi_2 \quad (14)$$

$$p_{1,n+1} = v(n+1)Tk_1 + \phi_1 \quad (15)$$

$$p_{2,n+1} = v[(n+1)T + \delta_2]k_2 + \phi_2 \quad (16)$$

Where $\phi_1$ and $\phi_2$ are unknown initial phases.

In order to solve for v from short period pulses (13) is subtracted from (14) and (15) from (16):

$$(p_{2,n} - p_{1,n}) = v[nTr_2 + \delta_1 k_2 - nTk_1] + (\phi_2 - \phi_1)$$

$$(p_{2,n+1} - p_{1,n+1}) = v[(n+1)Tk_2 + \delta_2 k_2 - (n+1)Tk_1] + (\phi_2 - \phi_1)$$

To eliminate unknown phases and solve for v these equations are subtracted:

$$v = [(p_{2,n+1} - p_{1,n+1}) - (p_{2,n} - p_{1,n})] / [(T+\delta_2)k_2 - (Tk_1 - \delta_1 k_2)]$$

Summing order in the numerator can be changed for:

$$v = [(p_{2,n+1} - p_{2,n}) - (p_{1,n+1} - p_{1,n})] / [(T+\delta_2)k_2 - (Tr_1 - \delta_1 k_2)] \quad (17)$$

For odd n $\delta_1$ and $\delta_2$ only change place to yield similar expression.

Again in (17) v is expressed as difference of phases of short and long period pulses. The unambiguous estimate for v is obtained if difference of $\delta_1$ and $\delta_2$ is kept small enough.

Advantage of this arrangement is that now there is no need to transmit short period pulses but $\delta_1$ and $\delta_2$ can be made $\sim T/2$. Their difference can be short and the transmitter can be used at double pulse repetition rate.

Thus there would be no potential problems due to transmitter behavior due to short pulse intervals. Further $\delta_1$ and $\delta_2$ can be made $\sim T/3$ and one more frequency at constant pulse repetition time could be added to get more independent estimates to reduce variance of v.

Figure 3:
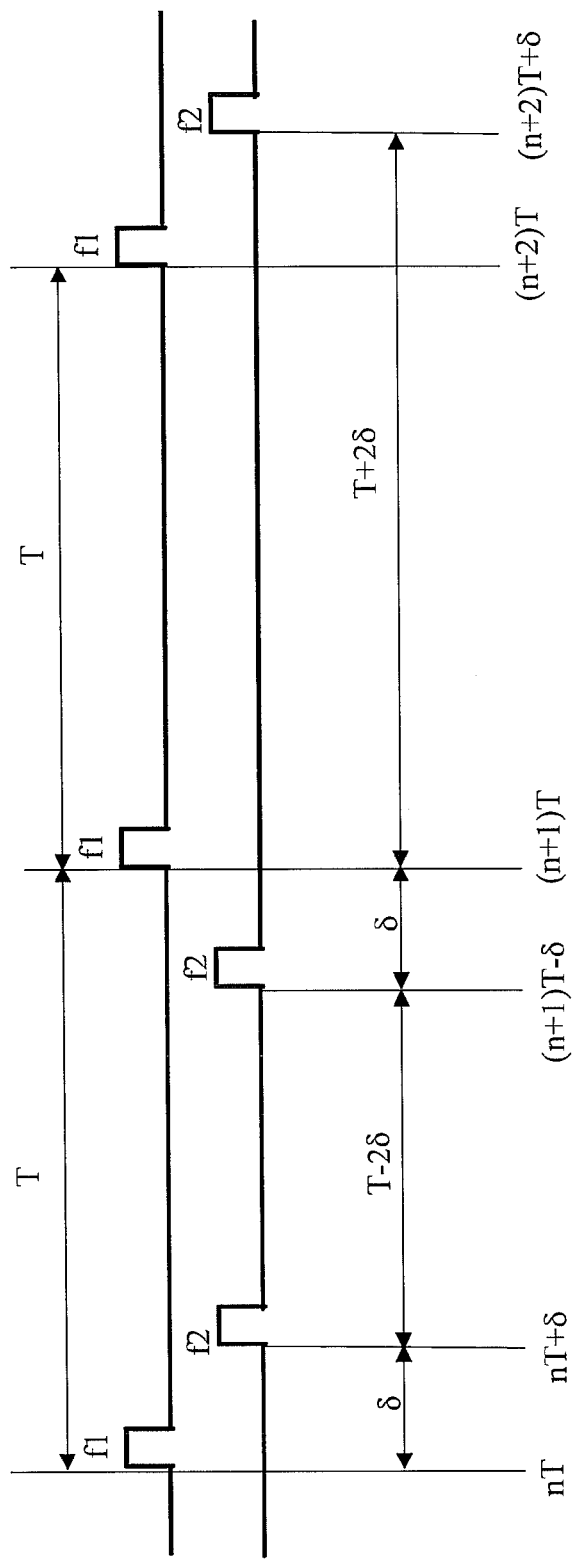
FIG. 3 shows a third embodiment in accordance it the invention where the first frequency is sent on constant PRT and second frequency with two alternating PRT.

FIG. 3 shows third embodiment where first frequency is sent on constant PRT and second frequency with two alternating PRT.

In this embodiment the first frequency is sent with constant pulse repetition interval T and the second frequency with two alternating intervals $T-2\delta$ and $T+2\delta$. Pulses of the second carrier frequency are sent at delay $\delta$ before and after the pulses of the first carrier frequency. It can be seen that if we choose $2\delta = \delta_1 - \delta_2$, the third embodiment is equivalent to the second embodiment.

Figure 4:
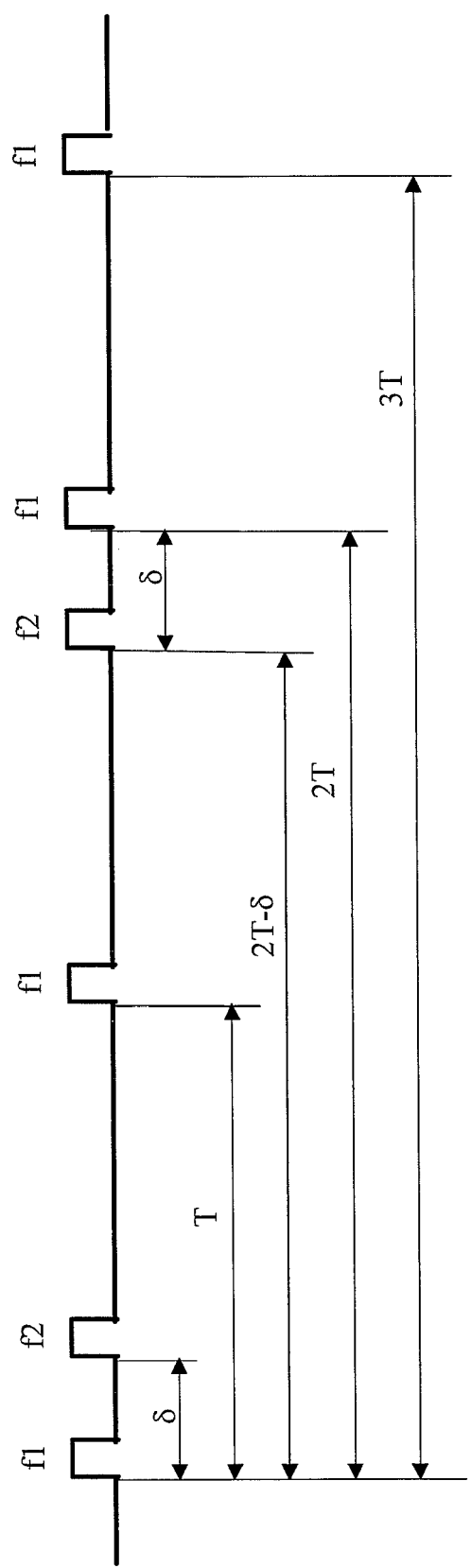
FIG. 4 shows a fourth embodiment in accordance it the invention where the first frequency is sent on constant PRT and second frequency is sent only for even pulses of the first frequency.

FIG. 4 shows fourth embodiment where first frequency is sent on constant PRT and second frequency is sent only for even pulses of the first frequency.

In this embodiment the first frequency is sent with constant pulse repetition interval T and the second carrier frequency is sent leading or lagging by delay $\delta$ the every second pulse of the first carrier frequency. It is easy to see that if in the third embodiment first carrier frequency would be transmitted by dual pulse repetition rate the transmit format would be analogous to the fourth embodiment. The fourth embodiment is thus a special case of the third embodiment where only every second pulse of the first frequency is used for resolving velocity ambiguities.

Even if above only four embodiments of the invention are presented it is clear for those familiar in the art that other embodiments of the invention can be found, which also remove unknown phase difference between pulses of different carrier frequencies.

The invention claimed is:

1. A method in connection with a weather radar, the method comprising the following steps:
   sending electromagnetic radiation in a pulsed manner to atmosphere,
   detecting radiation reflected or backscattered from the particles of the atmosphere, and
   defining at least phase differences ($\Delta p$) between the sent and received signals, characterized by
   sending at least two different carrier frequencies ($f_1$, $f_2$) with different pulse repetition times (PRT, $(T+\delta)$, $(T-\delta)$), such that at least the pulse repetition time (PRT, $(T+\delta)$, $(T-\delta)$) of one of the carrier frequencies ($f_2$) is continuously altered,
   defining the phase differences ($\Delta p$) between the sent and received signals at least at two different carrier frequencies ($f_1$, $f_2$),
   subtracting the defined phase differences ($\Delta p$) from each other in order to solve range and velocity ambiguity of the measurement, and
   eliminating unknown phase difference caused by distributed atmospheric target.

2. A method in accordance with claim 1, wherein the pulse repetition times (PRT) of both of the at least two different carrier frequencies ($f_1$, $f_2$) are staggered between two values.

3. A method in accordance with claim 1, wherein the pulse repetition time (PRT) of one ($f_2$) of the at least two different carrier frequencies ($f_1$, $f_2$) is staggered between two values.

4. A method in accordance with claim 3, wherein the pulse repetition time (PRT) of one ($f_2$) of the at least two different carrier frequencies ($f_1$, $f_2$) is staggered between more than two values.

* * * * *